US009118515B2

(12) United States Patent
Bar-Or et al.

(10) Patent No.: US 9,118,515 B2
(45) Date of Patent: Aug. 25, 2015

(54) CHANNEL ESTIMATION IN WIRELESS COMMUNICATION

(71) Applicant: FREESCALE SEMICONDUCTOR, INC., Austin, TX (US)

(72) Inventors: Amit Bar-Or, Nes-Ziona (IL); Kfir Bezalel, Holon (IL); Gideon S. Kutz, Ramat Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 120 days.

(21) Appl. No.: 14/150,158

(22) Filed: Jan. 8, 2014

(65) Prior Publication Data

US 2015/0195107 A1 Jul. 9, 2015

(51) Int. Cl.
*H04B 7/216* (2006.01)
*H04L 25/02* (2006.01)
*H04B 7/26* (2006.01)
*H04L 5/00* (2006.01)

(52) U.S. Cl.
CPC .......... *H04L 25/0236* (2013.01); *H04B 7/2618* (2013.01); *H04L 5/0048* (2013.01)

(58) Field of Classification Search
None
See application file for complete search history.

(56) References Cited

U.S. PATENT DOCUMENTS

| 6,647,055 B2 * | 11/2003 | Kuo ............................... 375/148 |
| 7,209,510 B2 | 4/2007 | Yang et al. |
| 2005/0036537 A1 * | 2/2005 | Zancho et al. ................. 375/148 |
| 2005/0201447 A1 * | 9/2005 | Cairns et al. .................. 375/148 |

FOREIGN PATENT DOCUMENTS

| EP | 0993129 A2 | 10/1999 |
| JP | 2000201102 A | 7/2000 |
| WO | 0036760 A1 | 6/2000 |
| WO | 0064085 A1 | 10/2000 |

* cited by examiner

Primary Examiner — Duc C Ho

(57) ABSTRACT

A channel estimation processor for a receiver in a wireless communication system is described. The channel estimation processor includes a stage-1 processor (STG1) arranged to pluralities of Nsym reference symbol correlation values per slot. The channel estimation processor includes a stage-2 processor (STG2) comprising a plurality of stage-2a processors for obtaining filtered outputs per slot, a respective plurality of stage-2b processors for obtaining respective slot filter results and a stage-2 adder (STG2ADD) for obtaining channel estimates for respective anchor positions. The stage-2a processors are arranged to filter respective pluralities of reference symbol correlation values using respective reference symbol filters (ga) to obtain a respective filtered output per slot. The stage-2b processors (STG2B1) are arranged to filter a predetermined number of Nslots associated filtered reference outputs using respective slot filters (a) with respective slot-specific filter coefficients (ai) to obtain a first slot filter result. The stage-2 adder (STG2ADD) is arranged to sum the slot filter results to obtain the channel estimate for anchor symbol positions. An interpolator is arranged to, for symbol positions different from anchor symbol positions, determine a channel estimate for the symbol position from interpolating the channel estimates for two closest anchor symbol positions.

20 Claims, 7 Drawing Sheets

CHANNEL ESTIMATION IN WIRELESS COMMUNICATION

FIELD OF THE INVENTION

This invention relates to channel estimation in wireless communication. In particular, this invention relates to channel estimation in a WCDMA system such as the so-called third-generation (3G) mobile phone systems, and in a TDMA system such as the so-called GSM systems.

BACKGROUND OF THE INVENTION

Wireless communication has continued to develop since its introduction, and is still developing by providing more bandwidth for more performance and more services. Channel estimation and equalization are used in wireless communication to handle effects that are intrinsic to a wireless channel, such as a variation in channel characteristics during communication. To support channel estimation in base stations and user terminals, wireless communication standard define so-called pilot sequences, allowing the base stations and user terminals to perform channel estimation by correlation received signals with known pilot sequences, and to derive a channel estimate from the correlation. Channel estimation is used in GSM as well as WCDMA wireless communication.

GSM (Global System for Mobile Communications, originally Groupe Spécial Mobile) has been a success since quite many years and has been developed over time to have more performance and provide more services. GSM networks operate in a number of different carrier frequency ranges, known as so-called 2G (GSM frequency ranges) and 3G (UMTS frequency bands). Regardless of the frequency band selected by an operator, the frequency band is divided into timeslots for individual phones to use. This allows eight full-rate or sixteen half-rate speech channels per radio frequency. These eight radio timeslots (or eight burst periods) are grouped into a Time Division Multiple Access (TDMA) frame. In TDMA, a timeslot is the basic radio resource used to facilitate communication between the handheld device and the base. Some of the bits (or symbols) that are transmitted during the time slot are known at the receiver side, and may be used in order to estimate the channel between the handheld device and the base station. Further, GSM uses General Packet Radio Service (GPRS) for data transmissions like browsing the web.

Third generation wireless communication has also developed to use Wideband Code Division Multiple Access (WCDMA or W-CDMA) communication. WCDMA is used by the Universal Mobile Telecommunications System (UMTS) family as was developed and maintained by the 3rd Generation Partnership Project (3GPP). It allows to achieve higher speeds and to support more users compared to time division multiple access (TDMA) and time division duplex (TDD) schemes used earlier.

A processor at the receiver side of a GSM or W-CDMA is usually arranged to perform channel and noise estimation to obtain an estimated channel response and an estimated noise variance by correlating a received signal (usually after some pre-processing) with one or more known transmitted pilot sequences. Channel estimation methods have become more advanced, but generally comprise quite computational intensive processing. There may be a wish to provide a more efficient method and device for channel estimation.

SUMMARY OF THE INVENTION

The present invention provides a method of channel estimation for symbol positions of a channel finger in a wireless communication system, a channel estimation processor for a receiver in a wireless communication system, a receiver for a wireless communication system, an apparatus for a wireless communication system, a wireless communication system, and computer program products as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
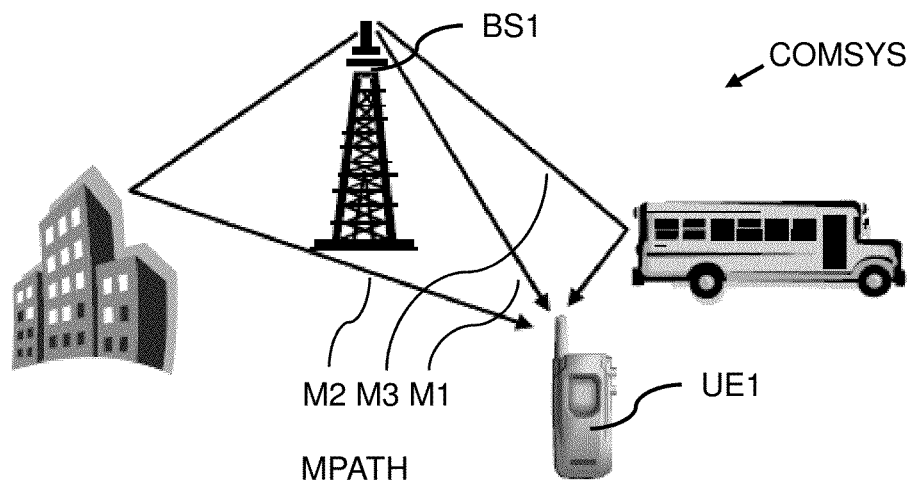
FIG. 1 schematically shows a wireless communication system.

FIG. 1 schematically shows a communication system COMSYS according to an embodiment. The communication system COMSYS may be, for example, a TDMA system such as a GSM system, or a WCDMA system, such as a UMTS system. The communication system COMSYS comprises a plurality of apparatuses, such as a base station BS1 and a handheld device UE1. In the following, reference will be made using common terminology from WCDMA, without being limited to WCDMA systems only; the WCDMA terminology is meant to refer to corresponding terminology for other communication systems. The base station BS1 and the UE UE1 are communicating over a plurality MPATH of signal paths M1, M2, M3. For example, the base station BS1 may transmit a signal formatted using spreading, scrambling and modulation into a plurality of frames, with each frame comprising a plurality of slots, with each slots comprising a plurality of symbols, each symbol having a length of a predetermined number of chips. For example, in WCDMA, a slot may have 10 symbols of 256 chips each. As indicated in FIG.

1, the signal as transmitted by the base station BS1 may be received by the UE UE1 via first, direct path M1 with a first signal delay as well as via a second path M2 and third path M3 while undergoing one or more reflections before arriving at the UE UE1 with second and third signal delays. As known in the art, the UE UE1 comprises a path search unit to detect a plurality of multi-path components in its received signal, where the multi-path components correspond to a plurality of differently distorted and differently delayed versions of the transmitted signal. Such multi-path components are commonly referred to as channel fingers, or—in short—, fingers. Further, the path search unit may be arranged to provide finger information FININFO associated with, for example, the (relative) delays of the fingers. The UE UE1 may be, as common in the art, arranged to retrieve the transmitted symbols from combining the different multi-path components, Hereto, the UE UE1 uses the relative delays, as well as so-called channel estimates of each of the finger. The channel estimates are determined using a process commonly referred to as channel estimation. Various methods for channel estimation are known. Known methods typically use correlation of the received signal with one or more reference symbols which are specifically included in the transmitted signal and usually defined as so-called pilot sequences or pilot symbols in a standard. The base station may have corresponding units as the UE. In an embodiment, the channel estimation provides a multi-tap fading channel between the sender and the receiver, e.g., from the UE to the base station, or from the base station to the UE. The channel estimation according to an embodiment may provide an efficient, yet accurate, channel estimation.

Figure 2:
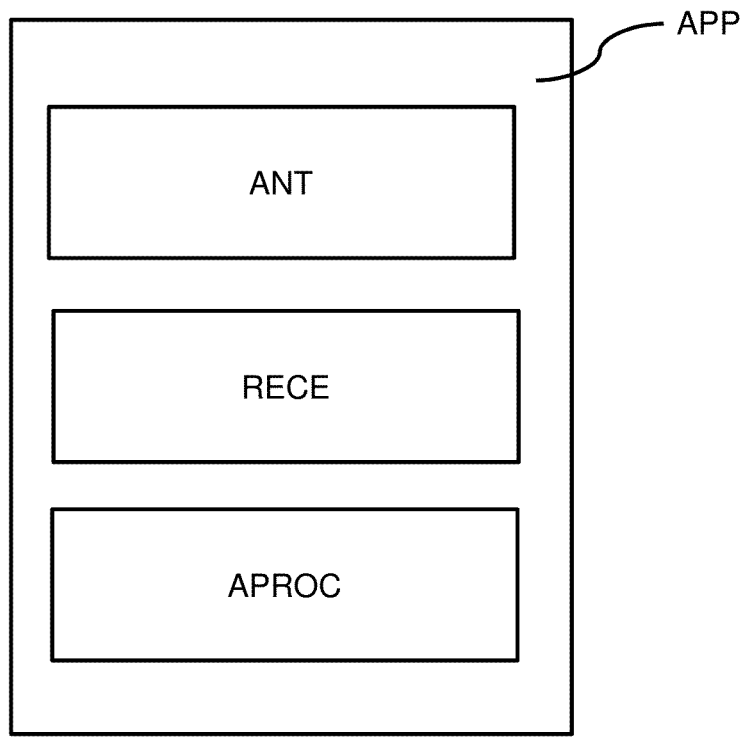
FIG. 2 schematically shows an apparatus of such a communication system.

FIG. 2 schematically shows an apparatus APP of such a communication system COMSYS. The apparatus APP may be a WCDMA apparatus, for example a UE or a base station. The apparatus comprises an antenna system ANT, a receiver RECE, and an application processor APROC. The antenna system ANT comprises one or more antennas arranged to receive respective one or more antenna signals. The receiver RECE is arranged to receive the one or more antenna signals, to demodulate and decode the antenna signals to obtain a decoded signal. The application processor APROC is arranged to receive the decoded signal and to, e.g., transform the decoded signal into, for example, an audio signal and/or an image to be presented to a user of the UE via a speaker and/or a display.

Figure 3:
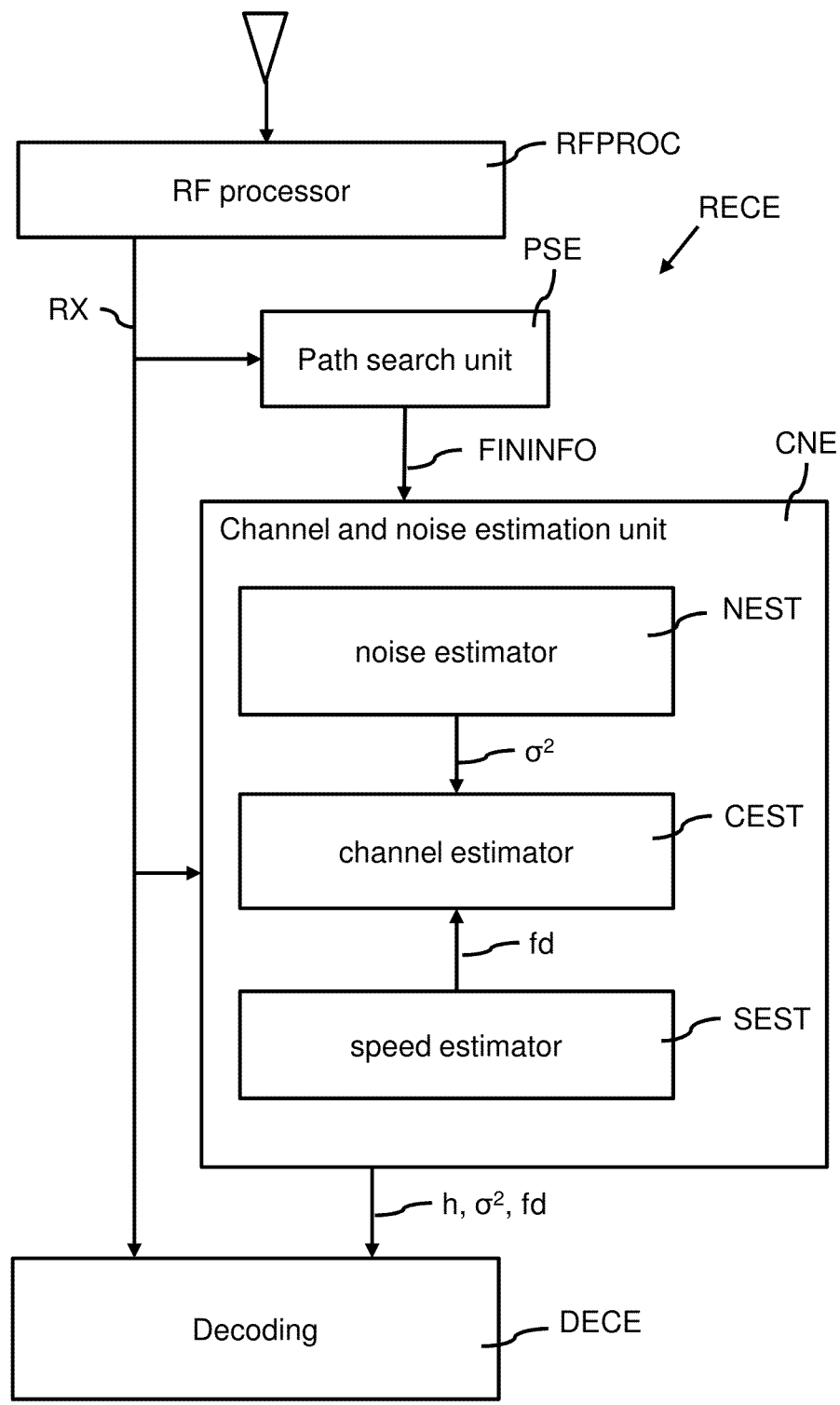
FIG. 3 schematically shows a receiver of such an apparatus.

FIG. 3 schematically shows receiver RECE of such an apparatus APP. The receiver RECE comprises an RF processor RFPROC arranged to receive the one or more antenna signals, to process the one or more antenna signals from an analogue radio-frequency domain into a digital signal RX. The digital signal RX may be considered to comprise contributions associated with the multiple fingers, which may further be referred to as one or more channel fingers.

The receiver RECE comprises a path search unit PSE arranged to detect the one or more channel fingers, to obtain finger information FININFO comprising a finger count, finger positions of the one or more channel fingers, and further information allowing to arrange the sequence of chips in a sequence of symbols with the symbols being arranged in slots of the channel fingers. The digital signal RX may thus be considered to represent the sequence of symbols arranged in slots. The symbols and slots may be according to a slot format defined by a standard associated with the communication system.

The receiver RECE further comprises a channel and noise estimation unit CNE and a decoder DECE. The channel and noise estimation unit CNE is arranged to receive the digital signal RX from the RF processor RFPROC and arranged to receive the finger information FININFO from the path search unit. The channel and noise estimation unit CNE comprises a noise estimation unit NEST, a channel estimation processor CEST and a speed estimation unit SEST. The noise estimation unit NEST is arranged to perform a noise estimation for each finger of the one or more channel fingers to obtain respective one or more channel noise estimates $\sigma^2$ associated with the fingers, and to provide the one or more channel noise estimates $\sigma^2$ to the channel estimation processor CEST. The one or more channel noise estimates $\sigma^2$ may also be provided to further processors or unit external to the channel and noise estimation unit CNE, such as the decoder DECE. The channel estimation processor CEST is arranged to perform a method of channel estimation for each finger of the one or more channel fingers to provide a channel estimate h for each of the fingers. The speed estimation unit SEST is arranged to perform a Doppler velocity estimation for each finger of the one or more channel fingers to obtain respective Doppler velocity measures associated with the fingers. The decoder DECE is arranged to receive the digital signal RX and is arranged to decode the sequence of symbols using the channel estimations h for all channel fingers of the one or more channel fingers. The decoder DECE may herein be arranged to also use the one or more channel noise estimates $\sigma^2$ and/or the Doppler velocity measure. The Doppler velocity measure may e.g. be a Doppler frequency fd or a Doppler velocity.

Figure 4:
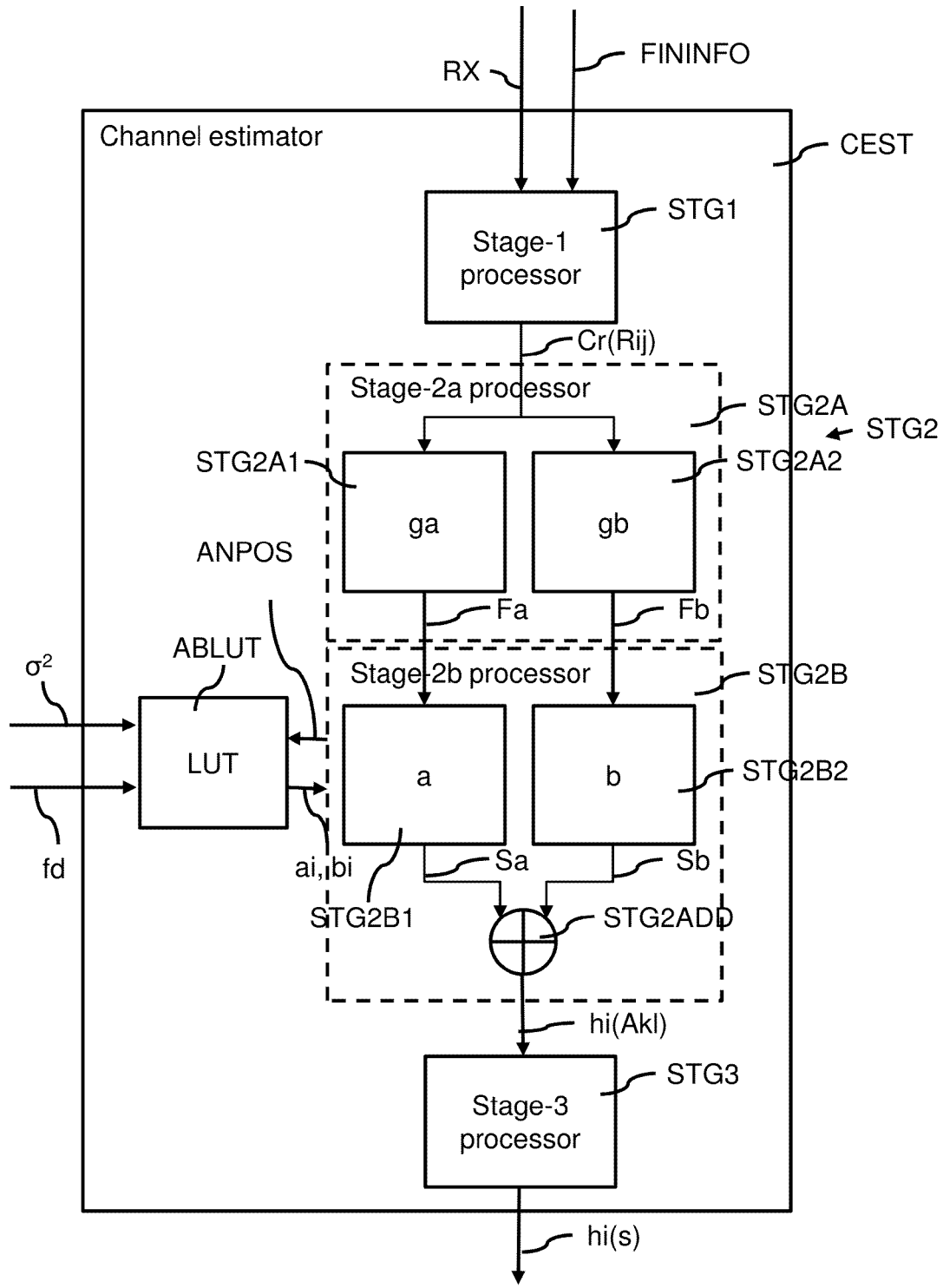
FIG. 4 schematically shows a detailed exemplary embodiment of channel estimation processor for a receiver in a wireless communication system.

FIG. 4 schematically shows a detailed exemplary embodiment of channel estimation processor CEST for a receiver RECE in a wireless communication system COMSYS. The channel estimation processor CEST comprises a stage-1 processor STG1, a stage-2 processor STG2 and a stage-3 processor STG3. In the exemplary embodiment, the channel estimation processor CEST further comprises a lookup table ABLUT. The channel estimation processor CEST is arranged to receive the finger information FININFO from the path search unit PSE and the digital signal RX representing the sequence of symbols arranged in slots from the RF processor RFPROC.

More specifically, the stage-1 processor STG1 may be arranged to: receive a sequence of symbols arranged in slots, and correlate the sequence of symbols with a plurality of reference symbols at Nsym reference symbol positions per slot using finger information FININFO associated with a channel finger to obtain pluralities of Nsym reference symbol correlation values Cr(Rij) per slot.

The Nsym reference symbol positions per slot may be determined according to a slot format as defined in a standard. The type of reference symbol at each reference symbol position may be defined in a standard. The reference symbols may e.g. be pilot symbols. For systems like WCDMA, the reference symbols may e.g. be symbols from the group consisting of pilot symbols, Transmission Power Control (TPC) symbols and Transport Format Combination Indicator (TFCI) symbols. The stage-1 processor STG1 may thus provide, for each slot, a respective plurality of Nsym reference symbol correlation values.

The correlation as performed in stage-1 may be according to known methods, such as e.g. described in international patent application WO 2000/036760 A1, by multiplying a complex know pilot symbol with a complex conjugate of the received version of the pilot symbol. However, WO 2000/036760 A1 perform a simple averaging of all pilot symbols in a slot, which may not always give a satisfying performance. The processor and methods according to embodiments as described in the current application, do not use such simple averaging within a slot, but effectively use an equivalent filter that is longer than a single slot length and that may moreover be more accurate inside a slot.

The stage-2 processor STG2 may comprising a plurality of stage-2a processors STG2A1, STG2A2 for obtaining filtered outputs Fa, Fb per slot, a respective plurality of stage-2b processors STG2B1, STG2B2 for obtaining respective slot filter results Sa, Sb and a stage-2 adder STG2ADD for obtaining channel estimates hi(Akl) for respective anchor positions. FIG. 4 schematically shows an exemplary embodiment wherein the plurality of stage-2a processors and stage-2b processors is two.

A first stage-2a processor STG2A1 of the plurality of stage-2a processors is arranged to, for each slot, filter the respective plurality of reference symbol correlation values using a first reference symbol filter ga to obtain a first filtered output Fa per slot, the first reference symbol filter ga having a set of Nsym first reference symbol coefficients ga(1), ... ga(Nsym).

A second stage-2a processor STG2A2 of the plurality of stage-2a processors is arranged to, for each slot, filter the respective plurality of reference symbol correlation values using a second reference symbol filter gb to obtain a second filtered output Fb per slot, the second reference symbol filter gb having a set of Nsym second reference symbol coefficients gb(1), ... gb(Nsym).

Any further stage-2a processors of the plurality of stage-2a processors may be arranged to, for each slot, obtain respective filtered outputs using respective reference symbol filters.

The reference symbol filters may in the following also be referred to as basis filters. Thus, the first reference symbol filter ga may be referred to as the first basis filter and the second reference symbol filter gb may be referred to as the second basis filter.

Using the reference symbol filters (basis filters) within a slot may provide a more accurate result than the simple averaging used in the prior art, such as in international patent application WO 2000/036760 A1.

The plurality of stage-2a processors STG2A1, STG2A2 may thus provide, for each slot, a plurality of filtered outputs Fa, Fb. The stage-2a processors STG2A1, STG2A2 may each be executed once per slot.

A first stage-2b processor STG2B1 of the plurality of stage-2b processors may be arranged to, for a plurality of anchor symbol positions, filter a predetermined number of Nslots first filtered reference outputs using a first slot filter a with first slot-specific filter coefficients ai to obtain a first slot filter result, the first slot-specific filter coefficients ai being established in dependence on at least the first reference symbol filter ga, the second reference symbol filter gb, the reference symbol positions, the anchor symbol position, a Doppler velocity measure, a length of an equivalent channel filter, a parameterization of an auto-correlation of the channel, and, optionally, a channel noise estimate.

A second stage-2b processor STG2B2 of the plurality of stage-2b processors may be arranged to, for the plurality of anchor symbol positions, filter a predetermined number of Nslots second filtered reference outputs using a second slot filter b with second slot-specific filter coefficients bi to obtain a second slot filter result, the second slot-specific filter coefficients bi being established in dependence on at least the first reference symbol filter ga, the second reference symbol filter gb, the reference symbol positions, the anchor symbol position, the Doppler velocity measure, the length of the equivalent channel filter, the parameterization of the auto-correlation of the channel, and, optionally, the channel noise estimate.

Where the plurality of stage-2b processors comprises more than two stage-2b processors, further stage-2b processors of the plurality of stage-2b processors may be arranged to, for each anchor symbol position in a slot, obtain respective slot filter results for the respective anchor position using respective slot filters.

The plurality of stage-2b processors STG2B1, STG2B2 may thus provide, for each slot, a respective plurality of slot filter results, Sa, Sb, for each anchor position. The stage-2b processors STG2B1, STG2B2 may each be executed once per anchor position per slot. I.e., if the slot comprises two anchor positions, each stage-2b processors STG2B1, STG2B2 may be executed twice per slot, with stage-2b processor and slot-specific filter coefficients established for the anchor positions.

The stage-2 adder STG2ADD is arranged to sum the slot filter results of the plurality of stage-2b processors STG2B1, STG2B2 to obtain the channel estimate for the anchor symbol position. Thus, where the plurality of stage-2b processors consists of two stage-2b processors STG2B1, STG2B2, the stage-2 adder STG2ADD sums the first slot filter result and the second slot filter result to obtain the channel estimate for the anchor symbol position.

The plurality of stage-2b processors and the stage-2 adder STG2ADD may thus provide, for each anchor position channel, a respective channel estimate.

The stage-3 processor STG3 comprises an interpolator arranged to, for symbol positions different from the anchor symbol positions: determine two closest anchor symbol positions, and determine a channel estimate for the symbol position from interpolating the channel estimates for two closest anchor symbol positions. The interpolation may be linear interpolation, or as well as any other suitable interpolation method. The interpolation may, where the distance between anchor positions is K, e.g., schematically be described as:

$$h(n \cdot T_{sym}) = c_1(n \bmod K) \cdot h\left(K \cdot n \cdot T_{sym} \cdot \left\lfloor \frac{n \cdot T_{sym}}{K} \right\rfloor\right) + c_2(n \bmod K) \cdot h\left(K \cdot n \cdot T_{sym} \cdot \left\lceil \frac{n \cdot T_{sym}}{K} \right\rceil\right)$$

wherein $T_{sym}$ denotes the length of a symbol expressed in units of time, and wherein $c_1$ and $c_2$ denote suitably selected functions providing interpolation weights. In the formula, n represents a symbol counter: for $h(n.K.T_{sym})$ it counts the anchors at anchor positions which are $K.T_{sym}$ distant for each other; for $h(n.T_{sym})$ it counts symbols at any symbol position, which are $T_{sym}$ distant for one another. Thus, before the interpolation stage we have a channel estimation every K*n symbols (the anchor positions), and after the interpolation we have an estimation for every symbol.

The two closest anchor positions may be within the same slot, or in adjacent slots. E.g., where the anchor positions correspond to positions 5 and 10 of each slot, the two closest anchor positions for symbol position 8 correspond to positions 5 and 10 within the same slot, whereas the two closest anchor positions for symbol position 1 are the anchor position corresponding to position 10 of the preceding slot and the anchor position corresponding to position 5 of the same slot as symbol position 1.

Hereby, channel estimates hi(s) may be obtained for all symbol positions in the slot, i.e., directly from the stage 2B processor STG2B for symbol positions corresponding to anchor positions and, from interpolation by the stage-3 processor STG3, for symbol positions different from anchor positions.

The use of a plurality of reference symbol filters together with a plurality of slot filters may be particularly efficient in terms of number of operations per second compared to prior art methods. The efficiency in terms of number of operations per second may, for example, be obtained as the relatively costly estimation is performed only for a selected set of symbols positions (the anchor symbol positions) while the estimation for the majority of the symbols in performed using a relatively low complexity interpolation method. The efficiency in terms of number of operations per second may additionally or alternatively be obtained by virtue of, for example, the estimation for the anchor symbol positions being decomposed into two phases, i.e. a first phase as performed by the stage-2a processor STG2A and a second phase as performed by the stage-2b processor STG2B which may allow replacing a complicated filtering which uses Nsym*Nslots taps operating in high frequency of symbol resolution with two consecutive filtering processes: the first phase may be composed from relatively short filters in the length of Nsym which operate in high frequency corresponding to symbol resolution, and which provides an output (comprising the first and second filtered outputs Fa and Fb) that is common to all anchors within the same slot, and the second phase may be composed from further relatively short filters in the length of Nslots which operate in low frequency corresponding to slot resolution.

The channel estimation processor CEST may comprise one or more lookup tables ABLUT comprising the slot-specific filter coefficients ai, bi of the slot filters a, b of the plurality of stage-2b processors STG2B1, STG2B2. The channel estimation processor may additionally or alternatively be arranged to cooperate with one or more lookup tables ABBUT comprising the slot-specific filter coefficients ai, bi of the slot filters a, b of the plurality of stage-2b processors STG2B1, STG2B2.

The one or more lookup tables ABLUT may comprise the slot-specific filter coefficients ai, bi of the slot filters a, b of the plurality of stage-2b processors STG2B1, STG2B2. The slot-specific filter coefficients ai, bi in the one or more lookup tables ABLUT may be being pre-determined in dependence on at least the plurality of reference symbol filters (i.e., at least the first reference symbol filter ga and the second reference symbol filter gb), reference symbol positions, an anchor symbol position value, a Doppler velocity measure value, a length of an equivalent channel filter and a parameterization of an auto-correlation of the channel, and, optionally, a channel noise estimate value. The slot-specific filter coefficients ai, bi may be established such the slot filters provide optimal FIR filters for modelling the channel estimate for a respective anchor position out of the filtered outputs, such that the stage-2 processor provides a subst. In determining the optimal FIR filters, a Linear-Minimum-Mean-Square-Error may be used as error criteria, but other criterions may also be applied. The stage-2b processors of the plurality of stage-2b processors may be arranged to establish the respective slot-specific filter coefficients ai, bi from retrieving the respective slot-specific filter coefficients ai, bi from the one or more lookup tables ABLUT in dependence on at least the anchor position ANPOS, the Doppler velocity measure fd and, optionally (and not drawn in FIG. 4), at least one of the channel noise estimate $\sigma^2$, the reference symbol positions and the length of the equivalent channel filter. In embodiments, the reference symbol positions and the length of the slot filters may be fixed, and the stage-2b processors of the plurality of stage-2b processors may be arranged to establish the respective slot-specific filter coefficients ai, bi from retrieving the respective slot-specific filter coefficients ai, bi from the one or more lookup tables ABLUT in dependence on the anchor position, a Doppler velocity measure and, optionally, a channel noise estimate. In alternative embodiments, the reference symbol may be different between different slots, and the stage-2b processors of the plurality of stage-2b processors may be arranged to establish the respective slot-specific filter coefficients ai, bi from retrieving the respective slot-specific filter coefficients ai, bi from the one or more lookup tables ABLUT in dependence at least on the anchor position, a Doppler velocity measure, the reference symbol positions and, optionally, a channel noise estimate. In further or alternative embodiments, the length of the equivalent channel filter may be a free parameter, and the stage-2b processors of the plurality of stage-2b processors may be arranged to establish the respective slot-specific filter coefficients ai, bi from retrieving the respective slot-specific filter coefficients ai, bi from the one or more lookup tables ABLUT in dependence at least on the anchor position, a Doppler velocity measure, the length of the equivalent channel filter, the reference symbol positions and, optionally, a channel noise estimate. In embodiments, a single lookup table ABLUT is provided. In alternative embodiments, a plurality of LUTs is provided, for example, one LUT per slot filter (i.e., comprising a first LUT comprising the first slot-specific filter coefficients ai and a second LUT comprising the second slot-specific filter coefficients bi).

In the above embodiments, the channel estimation processor CEST is arranged to establish the slot-specific filter coefficients ai, bi of the slot filters a, b of the plurality of stage-2b processors STG2B1, STG2B2 from retrieving pre-determined values from one or more lookup tables ABLUT.

In alternative embodiments, the channel estimation processor CEST may be arranged to establish the slot-specific filter coefficients ai, bi of the slot filters a, b of the plurality of stage-2b processors STG2B1, STG2B2 from solving a set of mathematical expressions relating the slot-specific filter-coefficients to the basis functions and involving the reference symbol positions, an anchor symbol position value, a Doppler velocity measure value, a length of an equivalent channel filter and a parameterization of an auto-correlation of the channel, and, optionally, a channel noise estimate value.

In embodiments, the anchor positions are equidistant. For example, the anchor positions may be spaced K symbols apart, such that an average number of S/K anchors per slot is obtained where each slot has S symbols. For example, where each slot has 10 symbols as in WCDMA, an average number of 10/K anchors is obtained.

In embodiments, the anchor positions are equidistant at a distance smaller than or equal to half of a slot length, i.e, K≤S/2. Hereby, at least two channel estimates may be obtained by the stage-2 processor per slot. For example, at a slot length of 10, the anchor positions may be at a distance of 5. In alternative embodiments, the anchors positions are equidistant at a distance larger than half of the slot length, i.e. K>S/2. Hereby, up to two channel estimates may be obtained by a stage-2 processor per slot. In examples, the overall performance in terms of accuracy of the estimation may decreases as for increasing K value, and the number of operation per second may decrease for increasing K value, such that the K value may be set by the application in order to determine a desired trade-off between performance and complexity.

In embodiments, the plurality of reference symbols comprises symbols from the group consisting of pilot symbols, TPC symbols and TFCI symbols. In embodiments, the reference symbol filters have a length in a range of 2 to 10 symbols, such as in a range of 2 to 6 symbols, such as in a range of 3 to 6 symbols, such as 6 symbols. Hereby, the reference symbol filters may be designed to reflect typical changes in the channel during a slot period, i.e., such that changes in the channel during a slot period may substantially correspond to one or more of the basis functions.

The receiver may comprise a programmable processor, the programmable processor being arranged to execute a program code comprising instructions for causing the programmable processor to perform channel estimation as described above.

The receiver may comprise a semiconductor circuitry, the semiconductor circuitry being specially designed to execute the method.

Determining the slot-specific filter coefficients of the plurality of slot filters may be performed as described in the following. The slot-specific filter coefficients as thus determined may be stored in the one or more lookup tables ABLUT. In the following, a slot length of 10 symbols will be used. The skilled person will appreciate that similar relationships may be derived for different slot lengths. In the following, a plurality of two basis functions, ga, gb, and a plurality of two slot filters a, b will be used with slot-specific filter coefficients ai, bi. The skilled person will appreciate that similar relationships may be derived for different pluralities of basis functions and slot filters. In the following, the slot index i may be given as a superscript to an entity X (i.e., as $X^i$) or as a symbol attached to an entity (i.e., as Xi).

An equivalent channel filter Ci may be defined as a filter of a length of N symbols or Nsym*Nslots symbols that implements the entire stage 2 for a specific anchor position. The equivalent channel filter Ci may also be referred to, in short, as equivalent filter Ci. The slot-specific filter coefficients ai, bi that satisfy MMSE criteria under the constraint that coefficients related to the same slot I will be a linear combination of the basis functions ga, gb. In order to calculate ai and bi under this constraint, the equivalent channel filter C may be written using the basis functions ga and gb and the slot filters ai and bi. As can be seen the equivalent channel filter C is from the form:

$$C = kron(ga, a) + kron(gb, b)$$

where kron(x,y) is the Kronecker product of x and y.

The length of the equivalent channel filter, as well as the filter latency, may be determined by an application according to a desired performance, a maximum operation count (MCPS consumption) and latency requirements.

Defining matrix Q and vector Z as:

$$Q = \begin{bmatrix} ga(1) & gb(1) \\ ga(2) & gb(2) \\ \vdots & \vdots \\ ga(Nsym) & gb(Nsym) \end{bmatrix}$$

$$Z^i = \begin{bmatrix} a^i \\ b^i \end{bmatrix},$$

i.e., $$\begin{bmatrix} Z^1 \\ Z^2 \\ \vdots \\ Z^{Nslots} \end{bmatrix} = \begin{bmatrix} a^1 \\ b^1 \\ a^2 \\ b^2 \\ \vdots \\ a^{Nslots} \\ b^{Nslots} \end{bmatrix}$$

Then, for each slot the following relationship between the equivalent filter C and the matrix G and vector Z exist:

$$\begin{bmatrix} C_1^i \\ C_2^i \\ \vdots \\ C_{Nsym}^i \end{bmatrix} = \begin{bmatrix} ga(1) & gb(2) \\ ga(2) & gb(2) \\ \vdots & \vdots \\ ga(Nsym) & gb(Nsym) \end{bmatrix} \cdot \begin{bmatrix} a^i \\ b^i \end{bmatrix} = Q \cdot Z^i \quad \text{(Equation 1)}$$

where,
$C_j^i$—tap value for slot #i, known symbol #j
Nsym—Number of known symbols in slot
$g_q(j)$—basis function value#q for known symbol #j The equivalent filter C as written above is expressed a column vector. When applying this filter on a column observation vector W (composed of the reference symbol correlation values of stage-1 output, as referred to with Cr(Rij) in FIG. 4), the operation may schematically be written as:

output=$C^T W$, where $C^T$ is the transpose of C. Transpose of the C column vector to a row vector gives:

$$\begin{bmatrix} C_1^i \\ C_2^i \\ \vdots \\ C_{Nsym}^i \end{bmatrix} = \begin{bmatrix} ga(1) & gb(1) \\ ga(2) & gb(2) \\ \vdots & \vdots \\ ga(Nsym) & gb(Nsym) \end{bmatrix} \cdot \begin{bmatrix} a^i \\ b^i \end{bmatrix} =$$

$$Q \cdot Z^i \Rightarrow [C_1^i \quad C_2^i \quad \vdots \quad C_{Nsym}^i] = [a^i \quad b^i] \cdot \begin{bmatrix} ga(1) & ga(2) & \vdots & ga(Nsym) \\ gb(1) & gb(2) & \vdots & gb(Nsym) \end{bmatrix}$$

Thus, the g functions first filter the observation vector, and next the slot filters filter the associated g function outputs.

The filter coefficient $\{Z^i\}_{i=1}^{Nslots}$ can be found from solving the following equation:

$$\begin{bmatrix} Z^1 \\ Z^2 \\ \vdots \\ Z^{Nslots} \end{bmatrix} = G^{-1} \cdot Q^H \begin{bmatrix} B(2\pi f_d|\tau_1 - \tau_d|) \\ B(2\pi f_d|\tau_2 - \tau_d|) \\ \vdots \\ B(2\pi f_d|\tau_N - \tau_d|) \end{bmatrix} \quad \text{(Equation 2)}$$

Where, G =

$$\left( \begin{bmatrix} Q^H & 0 & \cdots & 0 \\ 0 & Q^H & \cdots & 0 \\ \vdots & \vdots & \cdots & \vdots \\ 0 & 0 & \cdots & Q^H \end{bmatrix} \cdot \begin{bmatrix} B(2\pi f_d|\tau_1 - \tau_1|) & B(2\pi f_d|\tau_1 - \tau_2|) & \vdots & B(2\pi f_d|\tau_1 - \tau_N|) \\ B(2\pi f_d|\tau_2 - \tau_1|) & B(2\pi f_d|\tau_2 - \tau_2|) & \vdots & B(2\pi f_d|\tau_2 - \tau_N|) \\ \vdots & \vdots & \cdots & \vdots \\ B(2\pi f_d|\tau_N - \tau_1|) & B(2\pi f_d|\tau_N - \tau_2|) & \vdots & B(2\pi f_d|\tau_N - \tau_N|) \end{bmatrix} \begin{bmatrix} Q & 0 & \cdots & 0 \\ 0 & Q & \cdots & 0 \\ \vdots & \vdots & \cdots & \vdots \\ 0 & 0 & \cdots & Q \end{bmatrix} \right) + \left( \sigma^2 \begin{bmatrix} Q^H Q & 0 & \cdots & 0 \\ 0 & Q^H Q & \cdots & 0 \\ \vdots & \vdots & \cdots & \vdots \\ 0 & 0 & \cdots & Q^H Q \end{bmatrix} \right)$$

-continued

Where, $B(x)$ – Bessel function type 0

$f_c$ – Carrier frequency $v$ – velocity $N$ – filter length $t_d$ – Doppler frequency $= \dfrac{t_c \cdot v}{3 \cdot 10^8}$ $\tau_l$ – Time of symbol $l$ (FIR input), i.e. of reference symbol $\tau_d$ – Time of desired FIR output, i.e., of anchor position This formula may be considered to represent the Linear-Minimum-Mean-Square-Error formula for finding best filter (Wiener filter) coefficients in order to filter an observation vector in order to get the desired output under the constraint that taps related to the same slot will be a linear combination of the selected basis function.

In the formula, the B-function represents a Bessel function type 0. Such Bessel function type 0 is used to described the auto correlation of the channel tap according to a Rayleigh fading model, which is the model used by 3GPP for the purposes of, e.g., modelling in WCDMA communication systems. For other systems, a respective parameterization of an auto-correlation of the channel may be used.

From solving the above equations, filter coefficient $\{Z^i\}_{i=1}^{N_{slots}}$ can be found, and, thereby, the first and second slot-specific filter coefficients ai and bi.

Figure 5:
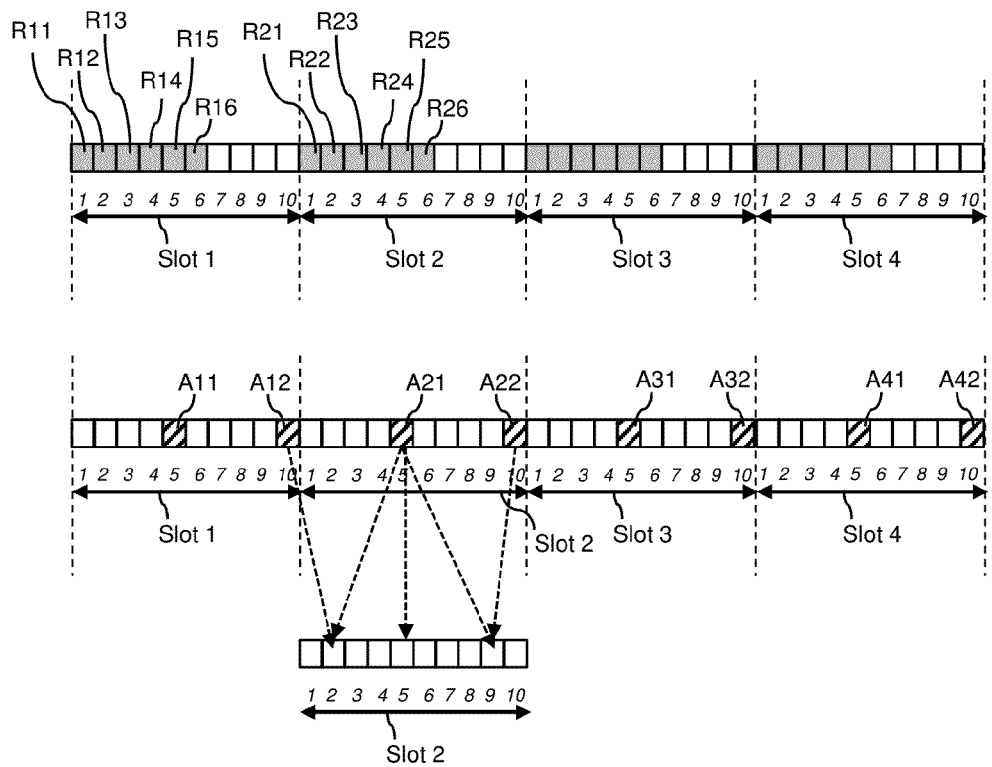
FIG. 5 schematically illustrates elements of a first, simplified example.

FIG. 5 schematically illustrates a first, simplified example. The top graph of FIG. 5 illustrates four subsequent slots Slot1, Slot2, Slot3, Slot4. Each slot has 10 symbols, indicated with a symbol counter 1, . . . , 10. The first six symbols of each slot are pilot symbols, which are used as reference symbols. E.g., the first slot Slot1 has six reference symbols R11, R12, R13, R14, R15, R16 at symbol positions 1 to 6 of the first slot, the second slot Slot2 has six reference symbols R21, R22, R23, R24, R25, R26. The reference symbols may be denoted as Rij, with i=slot number and j=1, . . . , 6.

The middle graph of FIG. 5 illustrates exemplary anchor positions. Anchor positions are equally spaced at a distance of K=5 symbols, whereby Na/2=10/5=2 anchor positions are provided per slot. FIG. 5 illustrates that the first slot Slot1 has anchor position A11 at symbol position 5 and anchor position A12 at symbol position 10. Slots Slot2, Slot3 and Slot4 likewise have anchor positions A21, A22, A31, A32 and A41, A42 at positions 5 and 10 within the respective slots, i.e., anchor positions Aip, with p denoting the p-th anchor position within a slot.

The equivalent filter of the example has a filter length of $N_{slots}$=5 slots. The filter has a filter latency of 11 symbols for the first anchor position Ai1 of each slot and a filter latency of 6 symbols for the second anchor position Ai2 in each slot.

The channel estimation processor CEST for this example is designed to use all six pilot symbols of each slot, i.e., Nsym=6. The first and second reference filters ga, gb thus each have a length of Nsym=6.

In this example, the first reference symbol filter ga is designed as ga=[1 2 3 4 5 6].

In this example, the second reference symbol filter gb is designed as gb=[11 −12 13 −14 15 −16].

The stage-1 processor STG1 correlate the received signal from the RX buffer for each 256 chips (for the reference symbols only) with the corresponding known reference sequence, and outputs its results as a Cr signal. The Cr signal now holds 6 complex reference symbol correlation values per slot: cri1, cri2, cri3, cri4, cri5, cri6.

The stage-2a processors filters this Cr signal with the ga and gb filters to obtain filtered outputs fai, fbi per slot from:
fai=1*cri1+2*cri2+3*cri3+4*cri4+5*cri6+6*cri6; and
fbi=11*cri1−12*cri2+13*cri3−14*cri4+15*cri6−16*cri6.

The filtered outputs fai, fbi are stored in Fa and Fb signals respectively. Each of the Fa and Fb signals are now holding one complex value per slot.

The stage-2b processors STG2B1, STG2B2 then perform, for the first anchor position, the following actions:
  a) Retrieve ai and bi values from the LUT ABLUT in dependence on the anchor position of the first anchor position. Since the filter length is 5 slots, each of the vectors ai and bi are in the length of 5;
  b) Filter Fa signal with a filter to obtain Sa;
  c) Filter Fb signal with b filter to obtain Sb;
  d) Accumulate the filters output Sa+Sb and store the result as channel tap estimation hi(i, position 5). This channel tap estimation is in slot resolution and it holds the channel tap estimation for symbol position #5 for each of the slots.

The stage-2 processors STG2B1, STG2B2 also performs the corresponding actions for the second anchor position, and obtains the channel tap estimation hi(i, position 10) for symbol position #10 for each of the slots.

The stage-3 processor then interpolates between the obtained channel tap estimations to obtain the channel tap estimation for all in-between symbols, i.e., at positions 1, 2, 3, 4, 6, 7, 8 and 9 of each slot. The interpolation is illustrated for positions 2 and 9 in the lower graph of FIG. 5: the channel tap estimation for symbol 2 in slot 2 is obtained from interpolating between anchor position A12 at symbol position 10 of slot 1 and anchor position A21 at symbol position 5 of slot 2; the channel tap estimation for symbol 9 in slot 2 is obtained from interpolating between anchor position A21 at symbol position 5 of slot 2 and anchor position A22 at symbol position 10 of slot 2. Symbol 5 in slot 2 relates to anchor position A21, such that the channel tap estimation for symbol 5 in slot 2 is directly taken from the channel tap estimation for anchor position A21.

In the example above, the ai and bi filter coefficients may be read from the lookup table ABLUT for the respective anchor positions. The lookup table ABLUT comprises predetermined values of the filter coefficients for the first anchor position (symbol position 5 within the slot) as well as the second anchor position (symbol position 10 within the slot). The predetermined values as stored in the lookup table ABLUT may have been obtained from equation 2 given above using:

$N = N_{slots} * N_{sym} = 5*6 = 30,$ and times of the reference symbols:

$\tau_1 = 0, \tau_2 = T_{sym}, \tau_3 = 2*T_{sym}, \tau_4 = 3*T_{sym}, \tau_5 = 4*T_{sym},$ $\tau_6 = 5*T_{sym}, \tau_7 = 10, \tau_8 = 11T_{sym}, \tau_9 = 12*T_{sym},$ $\tau_{10} = 13*T_{sym}, \tau_{11} = 14*T_{sym},$

...

$\tau_{25} = 40, \tau_{26} = 41T_{sym}, \tau_{27} = 42*T_{sym}, \tau_{28} = 43*T_{sym},$ $\tau_{29} = 44*T_{sym}, \tau_{30} = 45*T_{sym}$ and desired output times, i.e. times of the anchor positions:
$\tau_d = 34*T_{sym}$ for the first anchor position (at the fifth position in each slot), and
$\tau_d = 39*T_{sym}$ for the second anchor position (at the tenth position in each slot).

Figure 6:
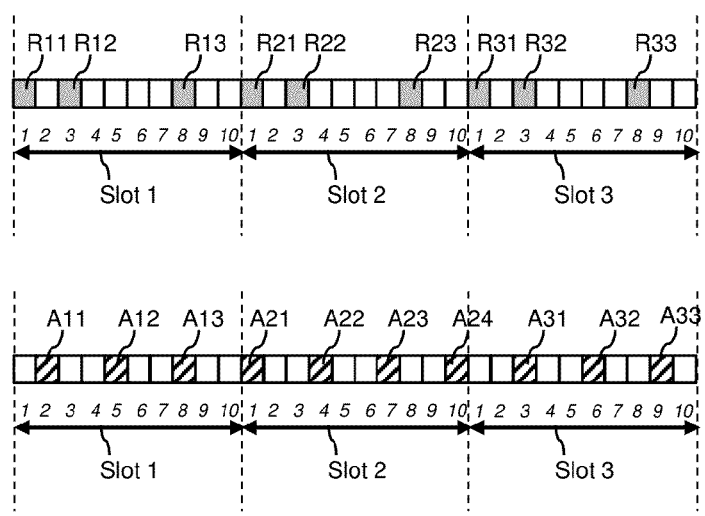
FIG. 6 schematically illustrates elements of a second, simplified example.

FIG. 6 schematically illustrates a first, simplified example. The top graph of FIG. 6 illustrates three subsequent slots Slot1, Slot2, Slot3. Each slot has 10 symbols, indicated with a symbol counter 1, ..., 10. The first and third of each slot are pilot symbols, the eighth symbol of each slot is a TPC symbol. These pilot symbols and TPC symbol are used as reference symbols. E.g., the first slot Slot1 has three reference symbols R11, R12, R13, at symbol positions 1, 3 and 8 of the first slot, the second slot Slot2 has also three reference symbols R21, R22, R23 at the same positions within the slot. The reference symbols may be denoted as Rij, with i=slot number and j=1, ..., 3.

The middle graph of FIG. 6 illustrates exemplary anchor positions. Anchor positions are equally spaced at a distance of K=3 symbols, whereby Na/2=10/3=3.33 anchor positions are provided on average per slot. FIG. 6 illustrates that the first slot Slot1 has anchor position A11 at symbol position 2, anchor position A12 at symbol position 5, and anchor position A13 at symbol position 8. The second slot Slot2 has anchor position A21 at symbol position 1, anchor position A22 at symbol position 4, anchor position A23 at symbol position 7 and anchor position A24 at symbol position 10. The third slot Slot3 has anchor position A31 at symbol position 3, anchor position A32 at symbol position 6, and anchor position A33 at symbol position 9. Thus, the number of reference symbols is the same for each slot, but the number of anchor positions is three or four. Further, in this example, the anchor positions are equally spaced at a distance K=3, but are not at the same symbol positions within each slot. Thus, in this example, the lookup table ABLUT comprises predetermined values of the filter coefficients for the anchor positions at any position within the slot. Further, the stage-2b processors have first and second slot-specific filters in the length of three as well as in the length of four. Hereto, the lookup table ABLUT comprises predetermined values of the filter coefficients for slot filters a, b having a length of three as well as for slot filters a, b having a length of four.

A performance comparison was made between an optimal channel estimation according to a prior art method and the channel estimation according to embodiments in various conditions, e.g. for N=9, $N_{sym}$=10, filter latency 40 and N=50, $N_{sym}$=3, Filter latency=0. The performance in terms of mean square error as a function of signal to noise ratio was shown to be negligible.

However, the number of instructions executed per second (MCPS) may be reduced by over a factor of 10 as is illustrated by the following examples for typical scenarios in a W-CDMA system operated at a 3.84 MHz chip rate, 200 users, 8 fingers per user, an equivalent filter length N:

a) MCPS for optimal algorithm in typical scenario with known algorithm:

| Stage | Formula | MCPS example (N = 90) | MCPS example (N = 50) |
|---|---|---|---|
| Stage 2 | $200 \cdot 8 \cdot \frac{3.84 \cdot N}{256}$ | 2160 | 1200 |
| Stage 3 | 0 | 0 | 0 |
| Total | | 2160 | 1200 | b) MCPS for proposed algorithm in typical scenario, with distance between anchor positions K:

| Stage | Formula | MCPS example (N = 90, K = 5) | MCPS example (N = 50, K = 5) |
|---|---|---|---|
| Stage 2 | $200 \cdot 8 \cdot \left(\frac{3.84 \cdot 2}{256 \cdot K} + \frac{3.84 \cdot N}{256 \cdot K \cdot 10}\right)$ | 53 | 33 |
| Stage 3 | $200 \cdot 8 \cdot \frac{3.84 \cdot 2}{256}$ | 48 | 48 |
| Total | | 101 (95% improvement) | 81 (93% improvement) |

Figure 7:
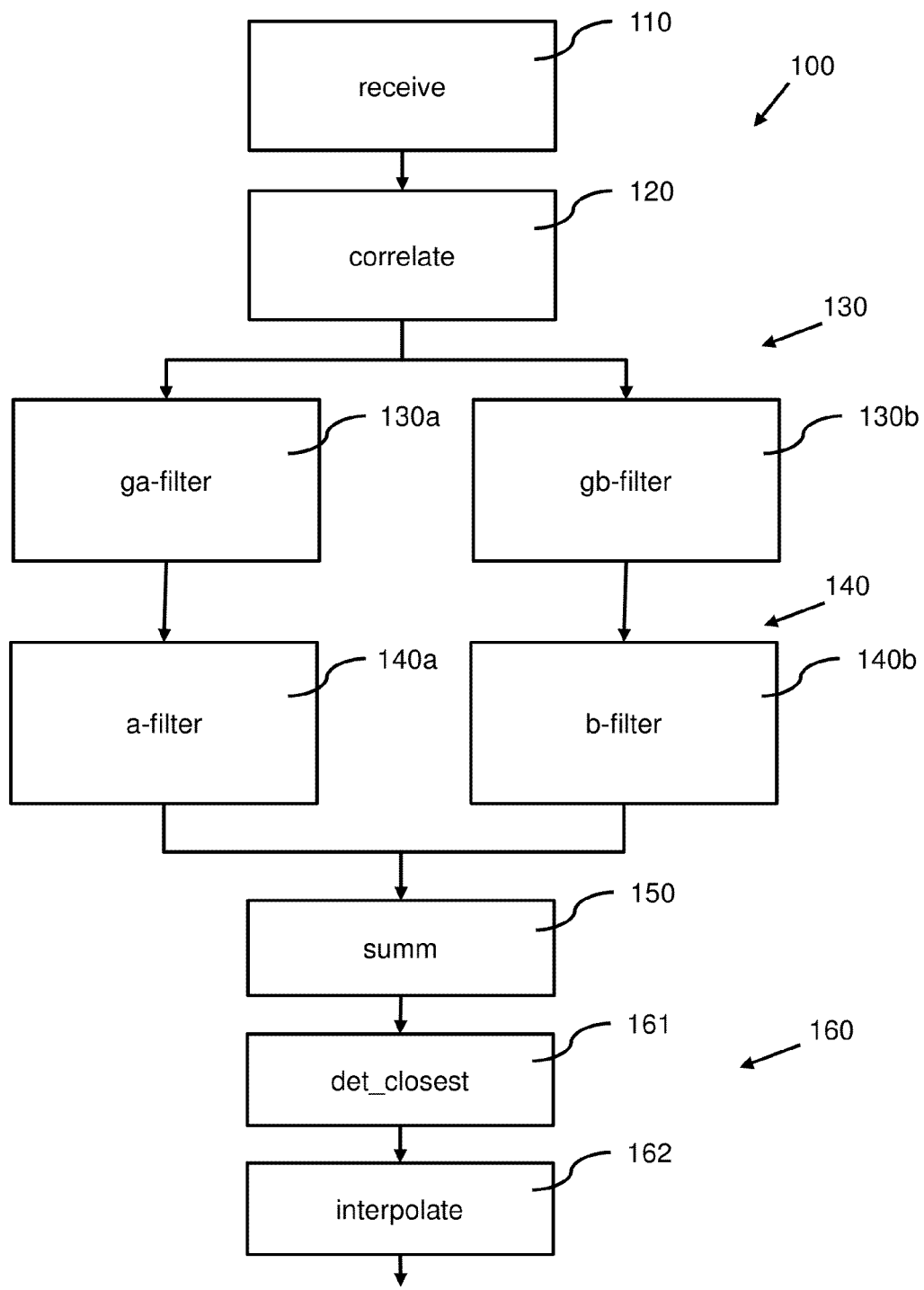
FIG. 7 schematically shows a method of channel estimation in a wireless communication system.

FIG. 7 schematically shows a method 100 of channel estimation for symbol positions of a channel finger in a wireless communication system. The method comprises receiving (110) a sequence of symbols arranged in slots and correlating (120) the sequence of symbols with a plurality of reference symbols at reference symbol positions per slot using finger information associated with the channel finger to obtain pluralities of Nsym reference symbol correlation values per slot.

The method 100 further comprises, for each slot:
filtering 130a the respective plurality of reference symbol correlation values using a first reference symbol filter ga of the plurality of reference symbol filters ga, gb to obtain a first filtered output per slot, the first reference symbol filter ga having a set of Nsym first reference symbol coefficients ga(1), ... ga(Nsym), and
filtering 130b the respective plurality of reference symbol correlation values using a second reference symbol filter gb of the plurality of reference symbol filters ga, gb to obtain a second filtered output per slot, the second reference symbol filter gb having a set of Nsym second reference symbol coefficients gb(1), ... gb(Nsym).

The method 100 further comprises, for a plurality of anchor symbol positions:
filtering 140a a predetermined number of Nslots first filtered reference outputs using a first slot filter a with first slot-specific filter coefficients ai to obtain a first slot filter result,
the first slot-specific filter coefficients ai being established in dependence on at least the first reference symbol filter ga, the second reference symbol filter gb, the reference symbol positions, the anchor symbol position, a Doppler velocity measure, a length of an equivalent channel filter N, a parameterization of an auto-correlation of the channel, and, optionally, a channel noise estimate, filtering 140b a predetermined number of Nslots second filtered reference outputs using a second slot filter b with second slot-specific filter coefficients bi to obtain a second slot filter result, the second slot-specific filter coefficients bi being established in dependence on at least the first reference symbol filter ga, the second reference symbol filter gb, the reference symbol positions, the anchor symbol position, the Doppler velocity measure, the length of the equivalent channel filter N, the parameterization of the auto-correlation of the channel, and, optionally, the channel noise estimate, and summing 150 the first slot filter result and the second slot filter results to obtain the channel estimate for the anchor symbol position.

The parameterization of an auto-correlation of the channel may e.g. use Bessel functions according to the model used in 3GPP for describing the auto-correlation for a Rayleigh fading model.

The slot-specific filter coefficients may be established such that the slot-specific filters are specifically well-suited or optimal for estimating the channel tap position out of the reference symbol filters (basis functions). Optimization may e.g. be performed using Linear-Minimum-Mean-Square-Error methods.

The method 100 further comprises, for symbol positions different from the anchor symbol positions:

determining 161 two closest anchor symbol positions, and determining 162 a channel estimate for the symbol position from interpolating the channel estimates for two closest anchor symbol positions.

In an embodiment, the anchor positions are equidistant.

In a further embodiment, the anchor positions are equidistant at a distance smaller than or equal to half of a slot length.

In another embodiment, the anchor positions are equidistant at a distance larger than half of a slot length.

In an embodiment, the first and second slot-specific filter coefficient (ai, bi) are retrieved as predetermined coefficients from one or more lookup tables in dependence on at least the anchor position, the Doppler velocity measure and, optionally, at least one of the channel noise estimate, the reference symbol positions and the length of the equivalent channel filter. The length of the equivalent channel filter and the reference symbol filters may be fixed in an embodiment. The length of the equivalent channel filter and the reference symbol filers may be free parameters and the first and second slot-specific filter coefficient ai, bi may be retrieved from the one or more lookup tables in dependence on the length of the equivalent channel filter and the reference symbol filters in another embodiment.

The plurality of reference symbols may comprise symbols from the group consisting of pilot symbols, TPC symbols and TFCI symbols.

In further embodiments, the method comprises, for each slot, filtering 130 the respective plurality of reference symbol correlation values using a plurality of reference symbol filters ga, gb to obtain a respective plurality of filtered outputs per slot; the filtering the respective plurality of reference symbol correlation values comprising:

filtering 130a the respective plurality of reference symbol correlation values using a first reference symbol filter ga of the plurality of reference symbol filters ga, gb to obtain a first filtered output per slot, the first reference symbol filter ga having a set of Nsym first reference symbol coefficients ga(1), . . . ga(Nsym), filtering 130b the respective plurality of reference symbol correlation values using a second reference symbol filter gb of the plurality of reference symbol filters ga, gb to obtain a second filtered output per slot, the second reference symbol filter gb having a set of Nsym second reference symbol coefficients gb(1), . . . gb(Nsym), and filtering the respective plurality of reference symbol correlation values using one or more further reference symbol filters of the plurality of reference symbol filters ga, gb to obtain respective further filtered outputs per slot, the one or more further reference symbol filters having respective sets of Nsym further reference symbol coefficients, and In these further embodiments, the method further comprises, for a plurality of anchor symbol positions:

filtering 140a a predetermined number of Nslots first filtered reference outputs using a first slot filter a with first slot-specific filter coefficients ai to obtain a first slot filter result, the first slot-specific filter coefficients a being established in dependence on at least the plurality of reference symbol filters, the reference symbol positions, the anchor symbol position, a Doppler velocity measure, a length of an equivalent channel filter N, a parameterization of an auto-correlation of the channel, and, optionally, a channel noise estimate, filtering 140b a predetermined number of Nslots second filtered reference outputs using a second slot filter b with second slot-specific filter coefficients bi to obtain a second slot filter result, the second slot-specific filter coefficients bi being established in dependence on at least the plurality of reference symbol filters, the reference symbol positions, the anchor symbol position, the Doppler velocity measure, the length of the equivalent channel filter (N), the parameterization of the auto-correlation of the channel, and, optionally, the channel noise estimate, and associated with each further reference symbol filter, filtering a predetermined number of Nslots of associated further filtered reference outputs using respectively associated further slot filters with associated further slot-specific filter coefficients to obtain respective further slot filter results, the associated further slot-specific filter coefficients being established in dependence on at least the plurality of reference symbol filters, the reference symbol positions, the anchor symbol position, the Doppler velocity measure, the length of the equivalent channel filter N, the parameterization of the auto-correlation of the channel, and, optionally, the channel noise estimate, In these further embodiments, the method further comprises summing 150 the first slot filter result, the second slot filter results and the further slot filter results to obtain the channel estimate for the anchor symbol position.

Thus, a plurality reference symbol filters and a corresponding plurality of slot filters may be used in these further embodiments, each slot filter filtering a predetermined number of Nslots filtered reference outputs of the reference symbol filters with respective slot-specific filter coefficients to obtain a respective plurality of slot filter results.

Figure 8:
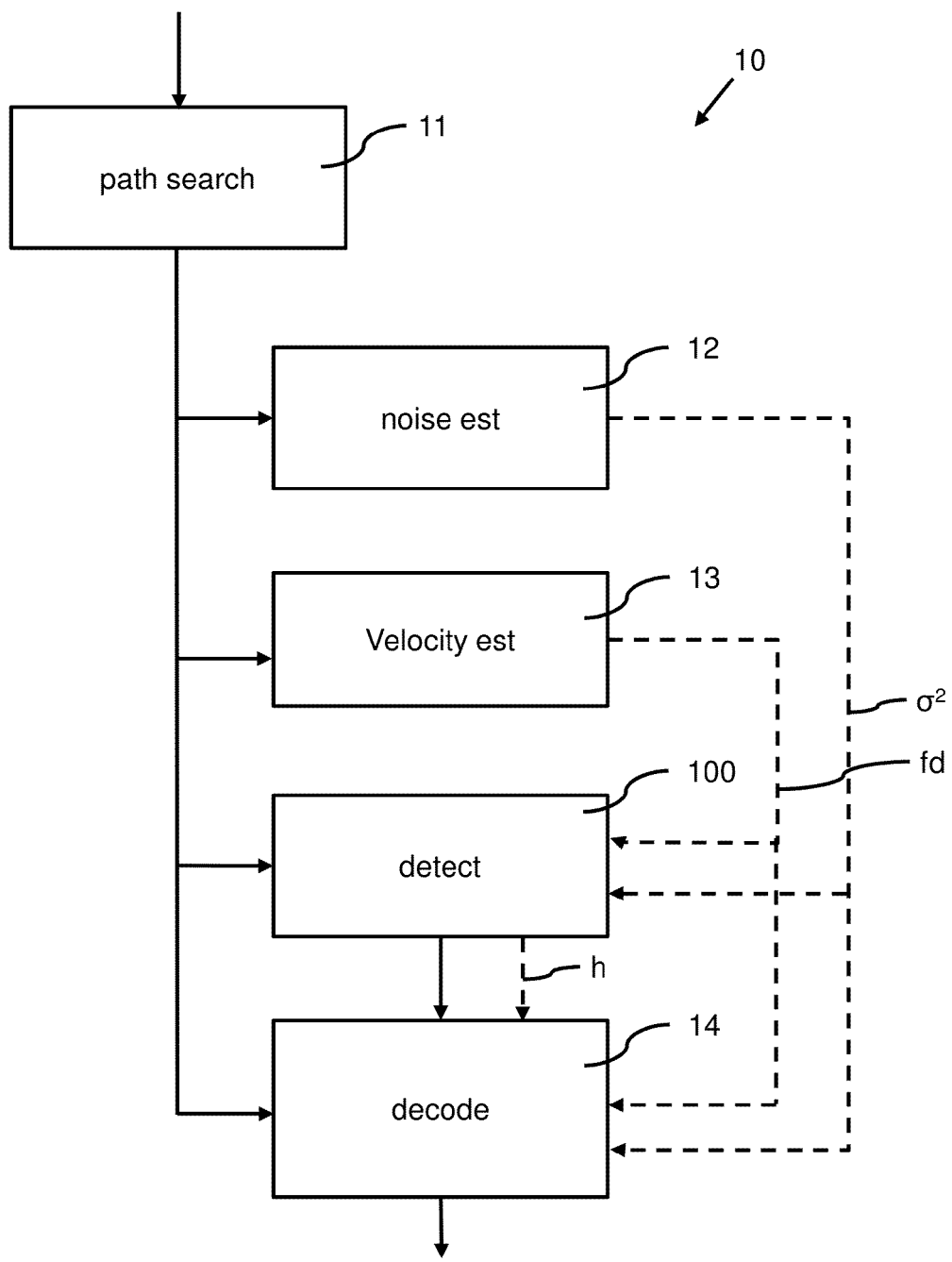
FIG. 8 schematically shows a method of processing a received antenna signal in a wireless communication system.

FIG. 8 shows a method 10 of processing a received antenna signal comprising a sequence of chips in a wireless communication system. Continuous arrows in FIG. 8 indicate an exemplary process flow. Dashed arrows indicate exemplary data flow of measured or determined values. The method comprises performing 11 a path search using the received antenna signal to detect one or more channel fingers, to obtain finger information comprising a finger count and finger positions of the one or more channel fingers and to arrange the sequence of chips in a sequence of symbols with the symbols being arranged in slots of the channel fingers. The method further comprises performing 100 a method of channel estimation of a channel finger according to any one of the embodiments described above for each finger of the one or more channel fingers. The method further comprises decoding 14 the sequence of symbols using the channel estimations for all channel fingers of the one or more channel fingers. The method may further comprise performing 12 a noise estimation for each finger of the one or more channel fingers to obtain respective channel noise estimates $\sigma^2$ associated with the fingers. Performing 12 the noise estimation may be performed per slot, per frame, once every FN frames, with FN being a predetermined number, at any other suitable frequency and/or initiated by a detection of a change of channel characteristics, such as a change in finger information. The method may further comprise performing 13 a Doppler velocity measure estimation for each finger of the one or more channel fingers to obtain respective Doppler velocity measures fd associated with the fingers. The Doppler velocity measure may be a measure of Doppler velocity measure, a measure of Doppler frequency, or any other suitable measure associated with a velocity of a device wherein the method is performed, such as a velocity of a UE moving at a speed of movement, Performing 13 the Doppler velocity may be performed per slot, per frame, once every FD frames, with FD being a predetermined number, at any other suitable frequency and/or initiated by a detection of a change of channel characteristics, such as a change in finger information. Performing 12 the noise estimation and performing 13 the Doppler velocity may be performed at the same frequency, or alternatively at different frequencies.

In performing 100 the method of channel estimation of a channel finger, establishing the first and second slot-specific filter coefficients ai, bi for an anchor symbol position within a current slot comprise detecting a change of the Doppler velocity measure between a preceding slot and the current slot, and, depending whether a change is detected or not, using the first and second slot-specific filter coefficients as established for the preceding slot if no change is detected and newly establishing the first and second slot-specific filter coefficients if a change is detected (from e.g., newly retrieving from the one or more lookup tables ABLUT, or from newly calculating the first and second slot-specific filter coefficients using equation 2). Alternatively, establishing the first and second slot-specific filter coefficients ai, bi may be performed for each slot.

Similarly may the establishing of the first and second slot-specific filter coefficients ai, bi for an anchor symbol position within a current slot comprise detecting a change of one or more of the respective channel noise estimates $\sigma^2$ between a preceding slot and the current slot, or between a preceding frame and a current frame, and, depending whether a change is detected or not, using the first and second slot-specific filter coefficients as established for the preceding slot if no such change is detected and newly establishing the first and second slot-specific filter coefficients if such change is detected.

The term detecting a change, between a previous measure value and a current measure value, may relate to detecting that a difference between the previous measure value and the current measure value is larger than a predetermined threshold, wherein the predetermined threshold may be associated with substantially equal or sufficiently equal values. For example, where a measure value may be within a range, a substantially equal value or sufficiently equal value may relate to a difference between the previous measure value and the current measure value of less than a predetermined fraction of the range, such as smaller than 10%, smaller than 5% or smaller than 1% of the range.

Figure 9:
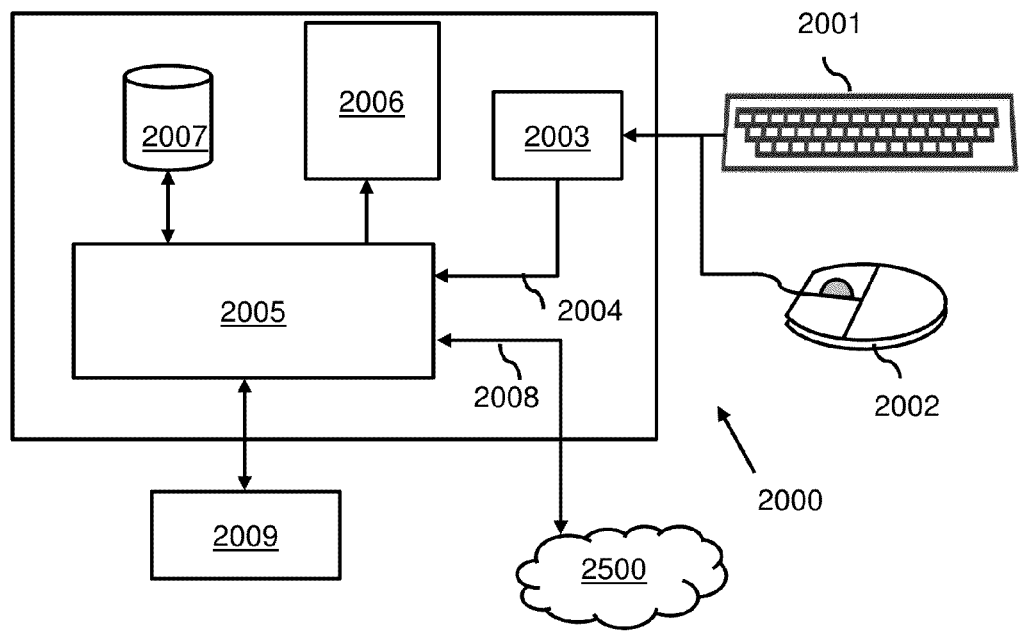
FIG. 9 schematically shows an exemplary user interaction system having a programmable processor.

FIG. 9 schematically shows an exemplary user interaction system 2000 having a programmable processor 2005. The user interaction system 2000 is shown to be a personal computer, but may be any type of suitable user interaction system 2000. The user interaction system 2000 further comprises a storage unit 2007, a user input 2003 and a display 2006, which may be the same as display 521 in FIG. 2 or an additional display. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods of generating a lookup table ABLUT comprising slot-specific filter coefficients for one or more slot-filters according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as the one or more lookup tables ABLUT. The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow to receive information from a user, such as information describing the reference symbol filters ga, gb and/or the slot-specific filters and/or other information relevant for the generation of the lookup tables. The processor 2005 may be capable to read, using the data I/O device 2009, a computer readable medium comprising a program code.

Figure 10:
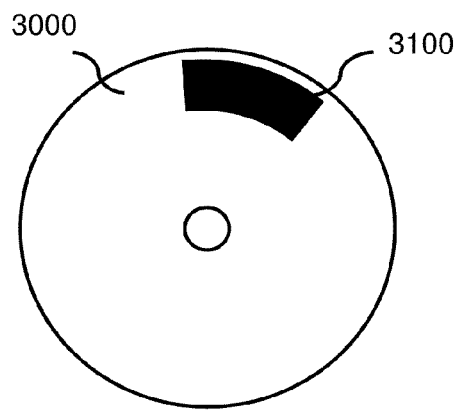
FIG. 10 schematically shows a computer readable medium comprising a computer program product.

FIG. 10 shows a computer readable medium 3000 comprising a computer program product 3100, the computer program product 3100 comprising instructions for causing a processor apparatus to perform a method of channel estimation for symbol positions of a channel finger in a wireless communication system according to an embodiment. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 10 as an optical disc, the computer readable medium 3000 may be any suitable computer readable medium, such as a hard disk, solid state memory, flash memory, etc., and may be non-recordable or recordable.

Figure 11:
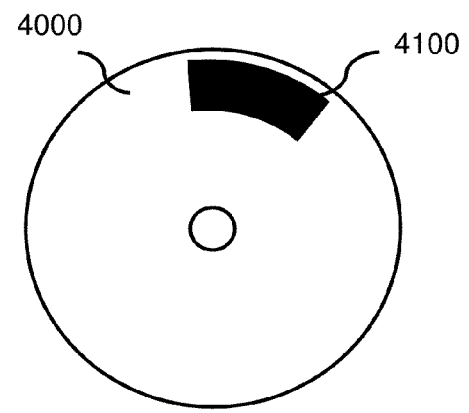
FIG. 11 schematically shows another computer readable medium 3000 comprising another computer program product.

FIG. 11 shows a computer readable medium 4000 comprising a computer program product 4100, the computer program product 4100 comprising instructions for causing a processor apparatus 2000 to perform a method of generating a lookup table ABLUT comprising slot-specific filter coefficients for one or more slot-filters suitable for use by a channel estimation processor according to an embodiment or by a method of channel estimation for symbol positions of a channel finger in a wireless communication system according to an embodiment from a LUT-generation program code executable on a programmable target, e.g., the processor 2005 of the user interaction system 2000 described above. The instructions are arranged to establish the slot-specific filter coefficients ai, bi of the lookup table ABLUT in dependence on at least one or more first reference symbol filters ga, one or more second reference symbol filters gb, one or more reference symbol positions, one or more anchor symbol positions, one or more Doppler velocity measure, one or more lengths of equivalent channel filters, one or more parameterizations of auto-correlation of the channel, and, optionally, one or more channel noise estimates. The computer program product 4100 may be embodied on the computer readable medium 4000 as physical marks or by means of magnetization of the computer readable medium 4000. However, any other suitable embodiment is conceivable as well. Furthermore, it will be appreciated that, although the computer readable medium 4000 is shown in FIG. 11 as an optical disc, the computer readable medium 4000 may be any suitable computer readable medium, such as a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of channel estimation for symbol positions of a channel finger in a wireless communication system, the method comprising:
receiving a sequence of symbols arranged in slots,
correlating the sequence of symbols with a plurality of reference symbols at reference symbol positions per slot using finger information associated with the channel finger to obtain pluralities of Nsym reference symbol correlation values per slot,
wherein for each slot:
filtering the respective plurality of reference symbol correlation values using a first reference symbol filter to obtain a first filtered output per slot, the first reference symbol filter having a set of Nsym first reference symbol coefficients,
filtering the respective plurality of reference symbol correlation values using a second reference symbol filter to obtain a second filtered output per slot, the second reference symbol filter having a set of Nsym second reference symbol coefficients,
wherein for a plurality of anchor symbol positions:
filtering a predetermined number of Nslots first filtered reference outputs using a first slot filter with first slot-specific filter coefficients to obtain a first slot filter result, the first slot-specific filter coefficients being established in dependence on at least the first reference symbol filter, the second reference symbol filter, the reference symbol positions, the anchor symbol position, a Doppler velocity measure, a length of an equivalent channel filter, a parameterization of an auto-correlation of the channel, and, optionally, a channel noise estimate,
filtering a predetermined number of Nslots second filtered reference outputs using a second slot filter with second slot-specific filter coefficients to obtain a second slot filter result,
the second slot-specific filter coefficients being established in dependence on at least the first reference symbol filter, the second reference symbol filter, the reference symbol positions, the anchor symbol position, the Doppler velocity measure, the length of the equivalent channel filter, the parameterization of the auto-correlation of the channel, and, optionally, the channel noise estimate,
summing the first slot filter result and the second slot filter results to obtain the channel estimate for the anchor symbol position; and
wherein for symbol positions different from the anchor symbol positions:
determining two closest anchor symbol positions, and
determining a channel estimate for the symbol position from interpolating the channel estimates for two closest anchor symbol positions.

2. A method according to claim 1, wherein the anchor positions are equidistant.

3. A method according to claim 2, wherein the plurality of reference symbols comprises symbols from the group consisting of pilot symbols, TPC symbols and TFCI symbols.

4. A method according to claim 1, wherein the anchor positions are equidistant at a distance smaller than or equal to half of a slot length.

5. A method according to claim 1, wherein the anchor positions are equidistant at a distance larger than half of a slot length.

6. A method according to claim 1, wherein the first and second slot-specific filter coefficient are retrieved as predetermined coefficients from one or more lookup tables in dependence on at least the anchor position, the Doppler velocity measure and, optionally, at least one of the channel noise estimate, the reference symbol positions and the length of the equivalent channel filter.

7. A method according to claim 6, wherein the anchor positions are equidistant.

8. A method according to claim 6, wherein the anchor positions are equidistant at a distance smaller than or equal to half of a slot length.

9. A method according to claim 6, wherein the anchor positions are equidistant at a distance larger than half of a slot length.

10. A method according to claim 6, wherein the plurality of reference symbols comprises symbols from the group consisting of pilot symbols, TPC symbols and TFCI symbols.

11. A method according to claim 1, wherein the plurality of reference symbols comprises symbols from the group consisting of pilot symbols, TPC symbols and TFCI symbols.

12. A method of processing a received antenna signal comprising a sequence of chips in a wireless communication system, the method comprising:
performing a path search using the received antenna signal to detect one or more channel fingers, to obtain finger information comprising a finger count and finger positions of the one or more channel fingers and to arrange the sequence of chips in a sequence of symbols with the symbols being arranged in slots of the channel fingers,
performing a method of channel estimation of a channel finger according to claim 2 for each finger of the one or more channel fingers, and
decoding the sequence of symbols using the channel estimations for all channel fingers of the one or more channel fingers.

13. A method of processing a received antenna signal comprising a sequence of chips in a wireless communication system, the method comprising:
performing a path search using the received antenna signal to detect one or more channel fingers, to obtain finger information comprising a finger count and finger positions of the one or more channel fingers and to arrange the sequence of chips in a sequence of symbols with the symbols being arranged in slots of the channel fingers,
performing a method of channel estimation of a channel finger according to claim 6 for each finger of the one or more channel fingers, and
decoding the sequence of symbols using the channel estimations for all channel fingers of the one or more channel fingers.

14. A method of processing a received antenna signal comprising a sequence of chips in a wireless communication system, the method comprising:
performing a path search using the received antenna signal to detect one or more channel fingers, to obtain finger information comprising a finger count and finger positions of the one or more channel fingers and to arrange the sequence of chips in a sequence of symbols with the symbols being arranged in slots of the channel fingers,
performing a method of channel estimation of a channel finger according to claim 1 for each finger of the one or more channel fingers, and decoding the sequence of symbols using the channel estimations for all channel fingers of the one or more channel fingers.

15. A method according to claim 14, the method further comprising:

performing a noise estimation for each finger of the one or more channel fingers to obtain respective channel noise estimates associated with the fingers, and performing a Doppler velocity measure estimation for each finger of the one or more channel fingers to obtain respective Doppler velocity measures associated with the fingers.

16. A channel estimation processor for a receiver in a wireless communication system, the channel estimation processor comprising:

a) a stage-1 processor arranged to:
receive a sequence of symbols arranged in slots,
correlate the sequence of symbols with a plurality of reference symbols at reference symbol positions per slot using finger information associated with a channel finger to obtain pluralities of Nsym reference symbol correlation values per slot, b) a stage-2 processor comprising a plurality of stage-2a processors for obtaining filtered outputs per slot, a respective plurality of stage-2b processors for obtaining respective slot filter results and a stage-2 adder for obtaining channel estimates for respective anchor positions, a first stage-2a processor of the plurality of stage-2a processors being arranged to, for each slot:
filter the respective plurality of reference symbol correlation values using a first reference symbol filter to obtain a first filtered output per slot, the first reference symbol filter having a set of Nsym first reference symbol coefficients, a second stage-2a processor of the plurality of stage-2a processors being arranged to, for each slot:
filter the respective plurality of reference symbol correlation values using a second reference symbol filter to obtain a second filtered output per slot, the second reference symbol filter having a set of Nsym second reference symbol coefficients, a first stage-2b processor of the plurality of stage-2b processors being arranged to, for a plurality of anchor symbol positions:
filter a predetermined number of Nslots first filtered reference outputs using a first slot filter with first slot-specific filter coefficients to obtain a first slot filter result, the first slot-specific filter coefficients being established in dependence on at least the first reference symbol filter, the second reference symbol filter, the reference symbol positions, the anchor symbol position, a Doppler velocity measure, a length of an equivalent channel filter, a parameterization of an auto-correlation of the channel, and, optionally, a channel noise estimate, a second stage-2b processor of the plurality of stage-2b processors being arranged to, for the plurality of anchor symbol positions:
filter a predetermined number of Nslots second filtered reference outputs using a second slot filter with second slot-specific filter coefficients to obtain a second slot filter result,
the second slot-specific filter coefficients being established in dependence on at least the first reference symbol filter, the second reference symbol filter, the reference symbol positions, the anchor symbol position, the Doppler velocity measure, the length of the equivalent channel filter, the parameterization of the auto-correlation of the channel, and, optionally, the channel noise estimate, the stage-2 adder being arranged to:
sum the slot filter results of the plurality of stage-2b processors to obtain the channel estimate for the anchor symbol position; and c) an interpolator arranged to, for symbol positions different from the anchor symbol positions:
determine two closest anchor symbol positions, and
determine a channel estimate for the symbol position from interpolating the channel estimates for two closest anchor symbol positions.

17. A channel estimation processor according to claim 16, comprising or arranged to cooperate with one or more lookup tables, the one or more lookup tables comprising the slot-specific filter coefficients of the slot filters of the plurality of stage-2b processors, the slot-specific filter coefficients being pre-determined in dependence on at least a first reference symbol filter, a second reference symbol filter, reference symbol positions, an anchor symbol position value, a Doppler velocity measure value, a length of an equivalent channel filter, a parameterization of an auto-correlation of the channel, and, optionally, a channel noise estimate value, and the stage-2b processors of the plurality of stage-2b processors being arranged to establish the respective slot-specific filter coefficients from retrieving the respective slot-specific filter coefficients from the one or more lookup tables in dependence on at least the anchor position, a Doppler velocity measure and, optionally, at least one of the channel noise estimate, the reference symbol positions and the length of the equivalent channel filter.

18. A receiver comprising a channel estimation processor according to claim 16.

19. A receiver according to claim 18, the receiver comprising a programmable processor, the programmable processor being arranged to execute a program code comprising instructions for causing the programmable processor to perform the method.

20. A receiver according to claim 18, the receiver comprising a semiconductor circuitry, the semiconductor circuitry being specially designed to execute the method.

* * * * *